US009244949B2

(12) United States Patent
Jin et al.

(10) Patent No.: US 9,244,949 B2
(45) Date of Patent: Jan. 26, 2016

(54) DETERMINING MAPPINGS FOR APPLICATION INTEGRATION BASED ON USER CONTRIBUTIONS

(71) Applicant: INTERNATIONAL BUSINESS MACHINES CORPORATION, Armonk, NY (US)

(72) Inventors: Qian Li Jin, Beijing (CN); Zheng Li, Beijing (CN); Jian Liu, Beijing (CN); Ji rong Ma, Beijing (CN); Lucas W. Partridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 13/928,600

(22) Filed: Jun. 27, 2013

(65) Prior Publication Data

US 2015/0006543 A1     Jan. 1, 2015

(51) Int. Cl.
    *G06F 17/30*    (2006.01)
(52) U.S. Cl.
    CPC ................. *G06F 17/30289* (2013.01)
(58) Field of Classification Search
    CPC .................................................. G06F 17/30289
    USPC ......................................................... 707/748
    See application file for complete search history.

(56) References Cited

U.S. PATENT DOCUMENTS

| | | | |
|---|---|---|---|
| 6,389,429 B1 * | 5/2002 | Kane et al. | 707/609 |
| 6,418,400 B1 * | 7/2002 | Webber | G06F 17/246 703/22 |
| 6,684,369 B1 * | 1/2004 | Bernardo | G06F 17/211 707/17.116 |
| 6,920,455 B1 * | 7/2005 | Weschler | 1/1 |
| 6,993,717 B2 * | 1/2006 | Minninger | 715/255 |
| 7,069,269 B2 | 6/2006 | Morris | |
| 7,152,090 B2 | 12/2006 | Amirisetty et al. | |
| 7,257,820 B2 | 8/2007 | Fischer et al. | |
| 7,281,018 B1 * | 10/2007 | Begun et al. | 1/1 |
| 7,698,383 B2 * | 4/2010 | Goring et al. | 709/219 |
| 7,721,193 B2 | 5/2010 | Upton | |
| 7,774,831 B2 * | 8/2010 | Kuznetsov et al. | 726/12 |
| 8,285,725 B2 * | 10/2012 | Bayliss | 707/748 |
| 2002/0035606 A1 * | 3/2002 | Kenton | 709/206 |
| 2004/0093344 A1 * | 5/2004 | Berger et al. | 707/102 |
| 2005/0060332 A1 * | 3/2005 | Bernstein | G06F 17/30569 |
| 2005/0149484 A1 * | 7/2005 | Fox et al. | 707/1 |

(Continued)

FOREIGN PATENT DOCUMENTS

WO     0239353 A1     5/2002

OTHER PUBLICATIONS

Huber, Thomas, et al., "Templates—Instruments for Standardizing ERP Systems", HICSS 2000, © IEEE, Jan. 4-7, 2000, 10 pages.*

(Continued)

*Primary Examiner* — Robert Stevens
(74) *Attorney, Agent, or Firm* — Maeve McCarthy (57) ABSTRACT

A method for determining mappings for application integration. The method includes identifying a plurality of integration templates that each contains a mapping of a first data field to another data field, wherein at least two of the plurality of integration templates map the first data field to different other data fields. The method includes receiving a ranking of each of the plurality of integration templates. The method includes determining a preferred mapping of the first data field to a second data field, based, at least in part, on the received ranking.

20 Claims, 4 Drawing Sheets

| INTEGRATION TEMPLATE | MAPPING PAIRS | RANKING |
|---|---|---|
| 1 | A1B2, B1C2, ... | 1 |
| 2 | B2C3, A1B3, ... | 3 |
| 3 | A2B3, C2A3, ... | 2 |
| 4 | B2A1, A3B2, ... | 1 |

(56) References Cited

U.S. PATENT DOCUMENTS

| | | | |
|---|---|---|---|
| 2005/0149536 A1* | 7/2005 | Wildes et al. | 707/100 |
| 2005/0257193 A1* | 11/2005 | Falk | G06F 8/34 |
| | | | 717/109 |
| 2007/0162537 A1* | 7/2007 | Juncker | 709/200 |
| 2008/0313594 A1* | 12/2008 | Smith | 717/100 |
| 2009/0171720 A1 | 7/2009 | Crook et al. | |
| 2011/0099139 A1 | 4/2011 | Coldicott et al. | |
| 2011/0131545 A1* | 6/2011 | Patrascu et al. | 717/100 |
| 2012/0030689 A1 | 2/2012 | Li et al. | |
| 2013/0024451 A1* | 1/2013 | Irons | 707/736 |
| 2014/0298151 A1* | 10/2014 | Fitzpatrick | 715/226 |

OTHER PUBLICATIONS

Dabkowski, Andrzej, et al., "Comprehensive Framework for Mobile ERP System", DEXA 2003, © IEEE, Sep. 1-5, 2003, 1993, pp. 890-894.*

Macik, Miroslav, et al., "Platform-Aware Rich-Form Generation for Adaptive Systems through Code-Inspection", SouthCHI 2013, LNCS 7946, Maribor, Slovenia, Jul. 1-3, 2013, © Springer-Verlag, Berlin, pp. 768-784.*

Sistrom, Chris L., et al., "Managing Predefined Templates and Macros for a Departmental Speech Recognition System Using Common Software", Journal of Digital Imaging, vol. 14, No. 3, Sep. 2001, pp. 131-141.*

Huaming, Zhao, "A Study on Architecture of Private Cloud Based on Virtual Technology", CSIE 2011, LNEE 126, Springer-Verlag, Berlin, Germany, © 2012, pp. 155-165.*

Chen, M. "Research and Implementation on Enterprise Application Integration Platform". 2009 International Forum on Information Technology and Applications. Copyright 2009 IEEE. pp. 93-96.

Friedrich, J. "Meta-Data Version and Configuration Management in Multi-Vendor Environments". SIGMOD 2005, Jun. 14-16, Maryland, USA. Copyright 2005 ACM. pp. 799-804.

"Bulk Mapping Nodes". Last updated: Monday, Nov. 5, 2012. [online] [Retrieved on: Mar. 1, 2013]. <http://pic.dhe.ibm.com/infocenter/wci/v6r1m0/topic/com.ibm.websphere.cast_iron.doc/map_Bulk_Mapping_Nodes.html>., 1 page.

* cited by examiner

| INTEGRATION TEMPLATE | MAPPING PAIRS | RANKING |
|---|---|---|
| 1 | A1B2, B1C2, ... | 1 |
| 2 | B2C3, A1B3, ... | 3 |
| 3 | A2B3, C2A3, ... | 2 |
| 4 | B2A1, A3B2, ... | 1 |

DETERMINING MAPPINGS FOR APPLICATION INTEGRATION BASED ON USER CONTRIBUTIONS

FIELD OF THE INVENTION

The present invention relates generally to the field of application integration, and more particularly to determining mappings for application integration based on user contributions.

BACKGROUND OF THE INVENTION

A growing number of business enterprise applications and systems need to be integrated in order to complete many business processes in today's complex business environment. Application integration is the sharing of processes and/or data between applications, both within a business enterprise and between different enterprises. Integration applications integrate a set of computer applications using software and computer systems. Typical integration applications treat all types of systems and applications as endpoints and abstract the endpoints to interfaces in order to simplify the process of integration. Every interface, however, has its own data formats and standards, thereby requiring a user to map between the different endpoints and data fields within each endpoint, or application. Often, a large number of data fields are involved in the process and, as a result, creating the mapping of endpoints can be tedious and error prone.

SUMMARY

Embodiments of the present invention disclose a method, computer program product, and computer system for determining mappings for application integration. The method includes identifying, by one or more computer processors, a plurality of integration templates that each contains a mapping of a first data field to another data field, wherein at least two of the plurality of integration templates map the first data field to different other data fields. The method includes receiving, by the one or more computer processors, a ranking of each of the plurality of integration templates. The method then includes determining, by the one or more computer processors, a preferred mapping of the first data field to a second data field, based, at least in part, on the received ranking.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer readable program code/instructions embodied thereon.

Any combination of computer-readable storage media may be utilized. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code may be transmitted using any appropriate medium, including but not limited to wireless, wireline, optical fiber cable, RF, etc., or any suitable combination of the foregoing.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
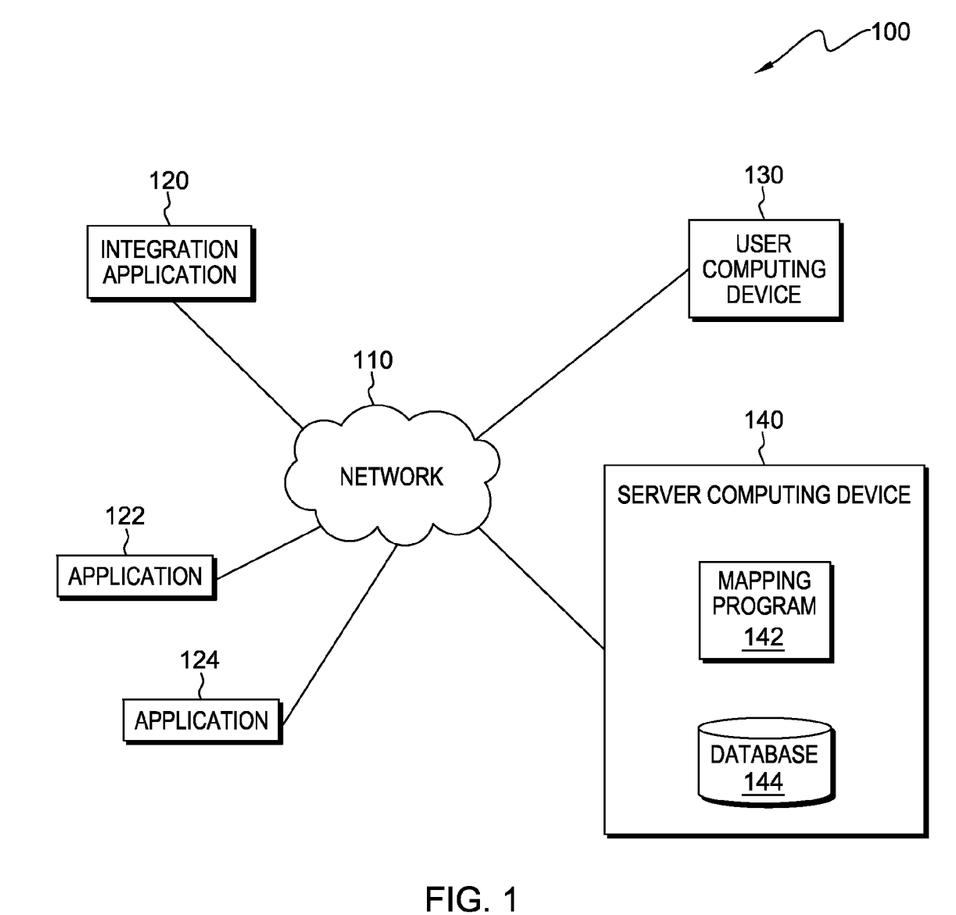
FIG. 1 is a functional block diagram illustrating a distributed application integration environment, in accordance with an embodiment of the present invention.

The present invention will now be described in detail with reference to the Figures. FIG. 1 is a functional block diagram illustrating a distributed application integration environment, generally designated 100, in accordance with one embodiment of the present invention.

Distributed application integration environment 100 includes integration application 120, application 122, application 124, user computing device 130 and server computing device 140, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between integration application 120, application 122, application 124, user computing device 130 and server computing device 140.

Integration application 120 is an application, or multiple applications, that can communicate, connect and automate through a series of interfaces and adapters in order to enable and perform integration between multiple business enterprise applications, such as application 122 and application 124 in distributed application integration environment 100. Integration includes mapping between applications, also called "endpoints" in application integration, for example, mapping output data fields of one system or application to input data fields of another system or application. Integration application 120 may require some user involvement, for example, manager approval or user input for endpoint mapping.

Application 122 and application 124 can each be enterprise applications within a single organization or within several different organizations that need to be integrated, or linked together, to simplify and automate business processes. Application 122 and application 124 may reside on different operating systems, use different database storage, use different computer languages or may be legacy systems that are no longer supported by the vendor who originally created them. Examples of applications represented by application 122 and application 124 may be supply chain management application for managing inventory and shipping, customer relations management application, business intelligence application and other types of application for managing data, such as human resources data, health care data, or internal communications, or any other applications that cannot typically communicate with one another to share data or business rules. While in FIG. 1, integration application 120, application 122 and application 124 are shown generally within distributed application integration environment 100 as accessible through network 110, one of skill in the art will appreciate that one or more of integration application 120, application 122 and application 124 may be located on either of a user computing device 130 or server computing device 140 for operation and use in conjunction with mapping program 142.

In various embodiments of the present invention, user computing device 130 can be a laptop computer, a tablet computer, a netbook computer, a personal computer (PC), a desktop computer, a personal digital assistant (PDA), a smart phone, or any programmable electronic device capable of communicating with integration application 120 and server computing device 140 via network 110. While only one user computing device is shown in FIG. 1, one of skill in the art will appreciate that within distributed application integration environment 100 there are typically multiple user computing devices creating a community of users, all communicating with integration application 120 and server computing device 140 via network 110.

Server computing device 140 includes mapping program 142 and database 144. Server computing device 140 can be a laptop computer, a tablet computer, a netbook computer, a PC, a desktop computer, a PDA, a smart phone, or any programmable electronic device capable of communicating with integration application 120, application 122, application 124 and user computing device 130 via network 110. In various embodiments of the present invention, server computing device 140 represents a computing system utilizing clustered computers and components to act as a single pool of seamless resources when accessed through a network, such as network 110. This is a common implementation for data centers and for cloud computing applications. Server computing device 140 may include internal and external components as depicted and described in further detail with respect to FIG. 4.

Mapping program 142 operates within distributed application integration environment 100 to analyze integration templates, each containing mappings for particular endpoints and data fields, which are published to a community of users by a user within the community of users, such as a user of user computing device 130. The community of users ranks the integration templates based on factors such as how useful or how accurate the mappings included in the integration template are for integrating the particular endpoints, for example, integrating application 122 and application 124 within distributed application integration environment 100. Mapping program 142 uses the analyzed information from the published integration templates and the rankings of the integration templates to determine weights of each mapping. Mapping program 142 updates stored data in database 144 with updated weighting and ranking information when there are new user contributions, for example, new integration templates for particular endpoint mappings are published or ranked within distributed application integration environment 100. In an exemplary embodiment of the present invention, mapping program 142 can create graphs representing the weights of published and ranked mappings, store the graphs in database 144, and update the created graphs with updated data. In various embodiments of the present invention, mapping program 142 presents the created graphs to users requesting mappings of particular endpoints.

Database 144 stores integration templates published by the community of users within distributed application integration environment 100 and the data associated with the stored integration template, such as ranking and weight information. Database 144 can store graphs created and updated by mapping program 142 to represent analyzed endpoint mappings information. While in FIG. 1, database 144 is shown within server computing device 140, one of skill in the art will appreciate that database 144 may be located external to server computing device 140 and accessible through network 110.

Figure 2:
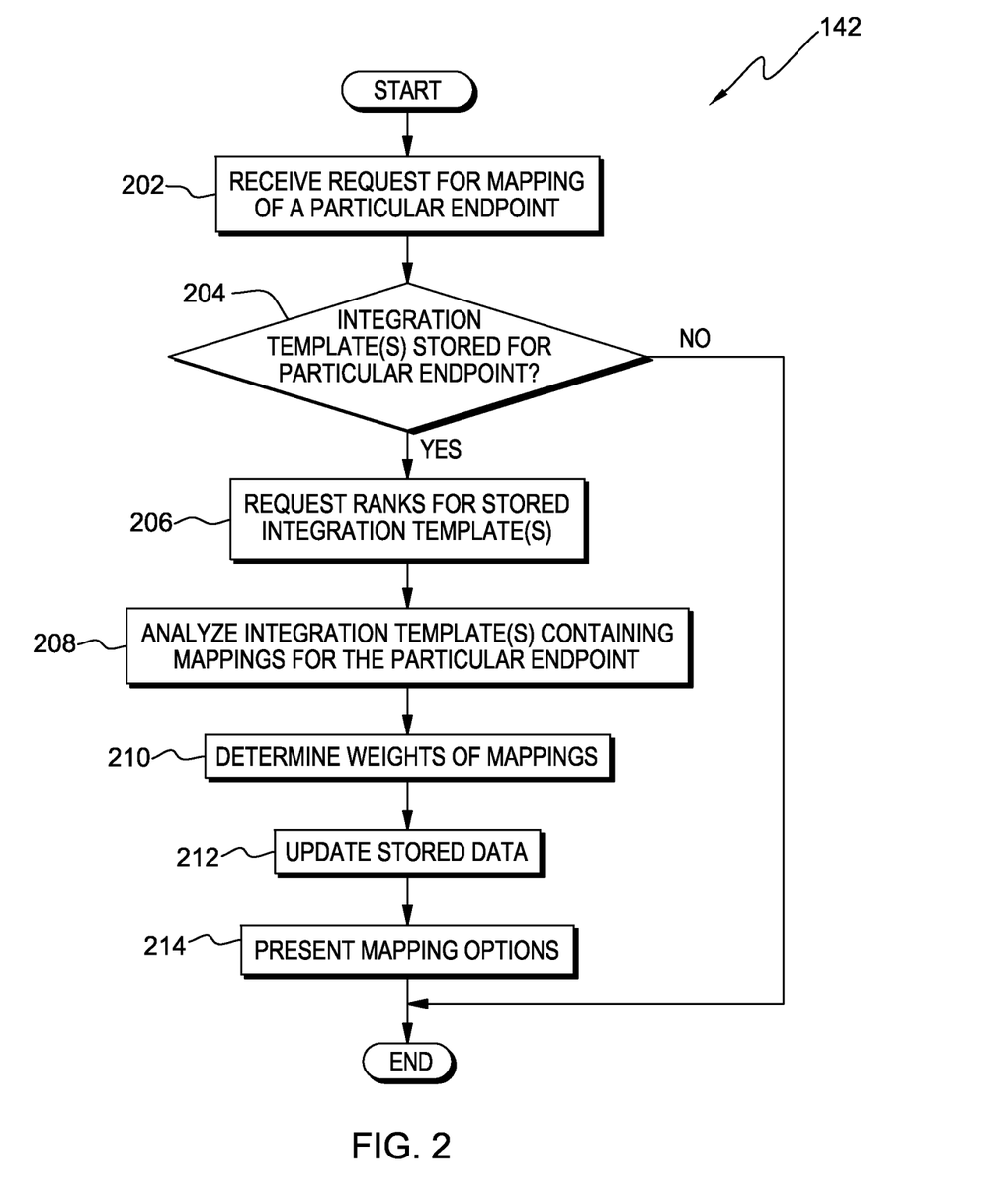
FIG. 2 is a flowchart depicting operational steps of a mapping program for analyzing published mappings and presenting mapping options, in accordance with an embodiment of the present invention.

FIG. 2 is a flowchart depicting operational steps of mapping program 142 for analyzing published mappings and presenting mapping options, in accordance with an embodiment of the present invention.

Mapping program 142 receives a request for a mapping of a particular endpoint (step 202). A request for a mapping of a particular endpoint can include a request for a mapping between particular endpoints, for example, a request for the mapping of a particular output data field of one application or endpoint, for example, application 122, to a preferred one of several input fields of another application or endpoint, for example, application 124. The request can be received from a program within distributed application integration environment 100 that is performing integration operations, such as integration application 120.

Mapping program 142 determines whether an integration template or multiple integration templates are stored for the particular endpoint (decision block 204). If mapping program 142 determines there are integration templates stored for the particular endpoint (decision block 204, yes branch), mapping program 142 requests ranks for the stored integration templates from database 144 (step 206). Mapping program 142 uses user contributions, for example, working integration templates and user rankings of the integration templates, which are stored in a database, such as database 144. Integration templates, or maps, contain mappings of particular endpoints or applications and can be published by a user, for example, a user operating user computing device 130, to a community of users within distributed application integration environment 100. The mappings between particular endpoints contained in the published integration templates are ranked by the community of users within the environment. In an exemplary embodiment of the present invention, the higher the rank given to an integration template, the more useful the mappings within the template are considered for integrating the particular endpoints. If mapping program 142 determines there have been no templates stored for the particular endpoints (decision block 204, no branch), the requestor may be notified, and mapping program 142 ends.

Mapping program 142 analyzes the integration templates containing mappings for the particular endpoint (step 208). Each integration template is ranked by the community of users, and, if there are multiple rankings, each integration template has an average ranking. For example, if a published integration template is ranked as a 4 by three users, and ranked as 5 by one user, then the overall ranking for the published integration template is the average ranking, 4.25. In an exemplary embodiment of the present invention, 5 is the most preferred ranking a published integration template can receive and a newly published integration template has a default ranking of 1.

Mapping program 142 determines weights of mappings (step 210), for example, an output data field to an input data field, based on the number of published integration templates that contain a mapping for the particular endpoints or applications. For example, if there are two or more integration templates that contain a mapping between the particular endpoints, the overall ranking of each integration template will be summed to obtain the weight of each of the mapping options contained in the integration templates. If there is only one integration template containing a particular endpoint to endpoint mapping, the weight is equal to the overall ranking of the one integration template.

Mapping program 142 updates stored data in database 144 (step 212). Data for each published integration template, and associated ranking and weight information for mapping options contained in each integration template, is stored in a database, for example, database 144 in distributed application integration environment 100. After analyzing published integration templates, mapping program 142 updates the stored data, including relevant weight values, with data from newly published integration templates.

In an exemplary embodiment of the present invention, mapping program 142 can create a graph representing the data field to data field mapping data for particular endpoints. Mapping program 142 can use the analyzed information for stored integration templates containing the particular endpoints, and create a graphical depiction with edges and vertices. In an exemplary embodiment of the present invention, the vertices represent data fields being mapped, and the edges between vertices represent a mapping between the data fields, and are labeled with the determined weight. Two data fields connected by a mapping are called a "mapping pair." A graphical depiction created by mapping program 142 is further described with reference to FIG. 3B.

Mapping program 142 presents the mapping options for the particular endpoint, or for between particular endpoints (step 214). In an exemplary embodiment of the present invention, mapping program 142 may present the mapping options to the user using a created graph containing visual indications, including, for example, color, font size or weight, or line thickness, to indicate relative strength of the weighted mappings. The user may then choose a mapping. In various other embodiments of the present invention, mapping program 142 may automatically perform the mapping using a preferred mapping, which can be the data field to data field mapping option with the highest weight, as compared to other mapping options by sending the preferred mapping to integration application 120. If two or more mappings have equal weights, mapping program 142 can present the mapping options to the user. The user may choose which mapping to use based on a variety of factors including, for example, supplementary information indicating what business use case was addressed by each mapping of the particular endpoints.

Figure 3A:
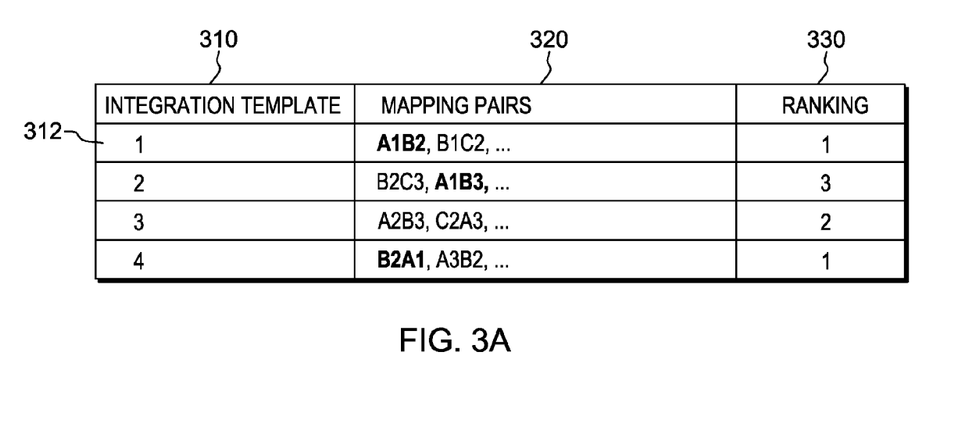
FIG. 3A is an exemplary depiction of stored mapping pairs for use with the mapping program of FIG. 2, in accordance with an embodiment of the present invention.

FIG. 3A is an exemplary depiction of stored mapping pairs from published integration templates for use with mapping program 142, in accordance with an embodiment of the present invention. FIG. 3A includes four integration templates published within distributed application integration environment 100, represented in column 310. Each of the four integration templates contain mapping information between two of three different entities, A, B, and C, which may be different enterprise applications, or endpoints. Each of the entities contains different data fields represented by A1, A2, A3, etc. Each integration template contains mapping pairs of data fields, as shown in column 320, such as the mapping pair "A1B2" from integration template 1 (row 312), representing mapping options of data fields between endpoint A and endpoint B. Each integration template is ranked by a community of users, and the overall ranking, determined by mapping program 142, is shown in column 330.

Figure 3B:
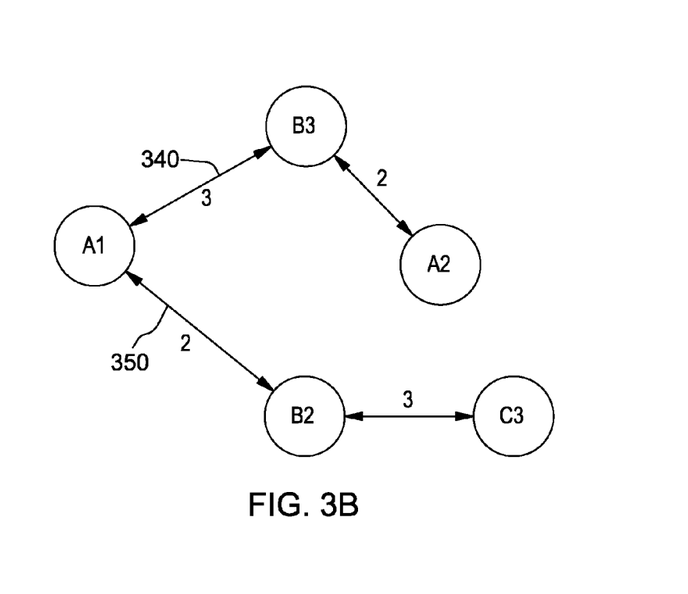
FIG. 3B is an exemplary graphical depiction of mapping options determined using the mapping program of FIG. 2, in accordance with an exemplary embodiment of the present invention.

FIG. 3B is an exemplary graphical depiction of mapping options determined using mapping program 142, in accordance with an exemplary embodiment of the present invention. Mapping program 142 determines a weight for each mapping pair, based on the number of published integration templates containing the mapping pair and the rank of each published integration template. For example, mapping pair "A1B3" is only seen once, in integration template 2 of FIG. 3A, with an overall rank of "3". Therefore, the weight of mapping pair "A1B3" is "3", as shown by edge 340. As another example, mapping pair "A1B2" is seen in integration template 1 and in integration template 4. The overall rank of each integration template is "1", and therefore the weight of mapping pair "A1B2", determined by summing the overall rank of each integration template containing the mapping pair, is "2", as shown by edge 350 in FIG. 3B.

Figure 4:
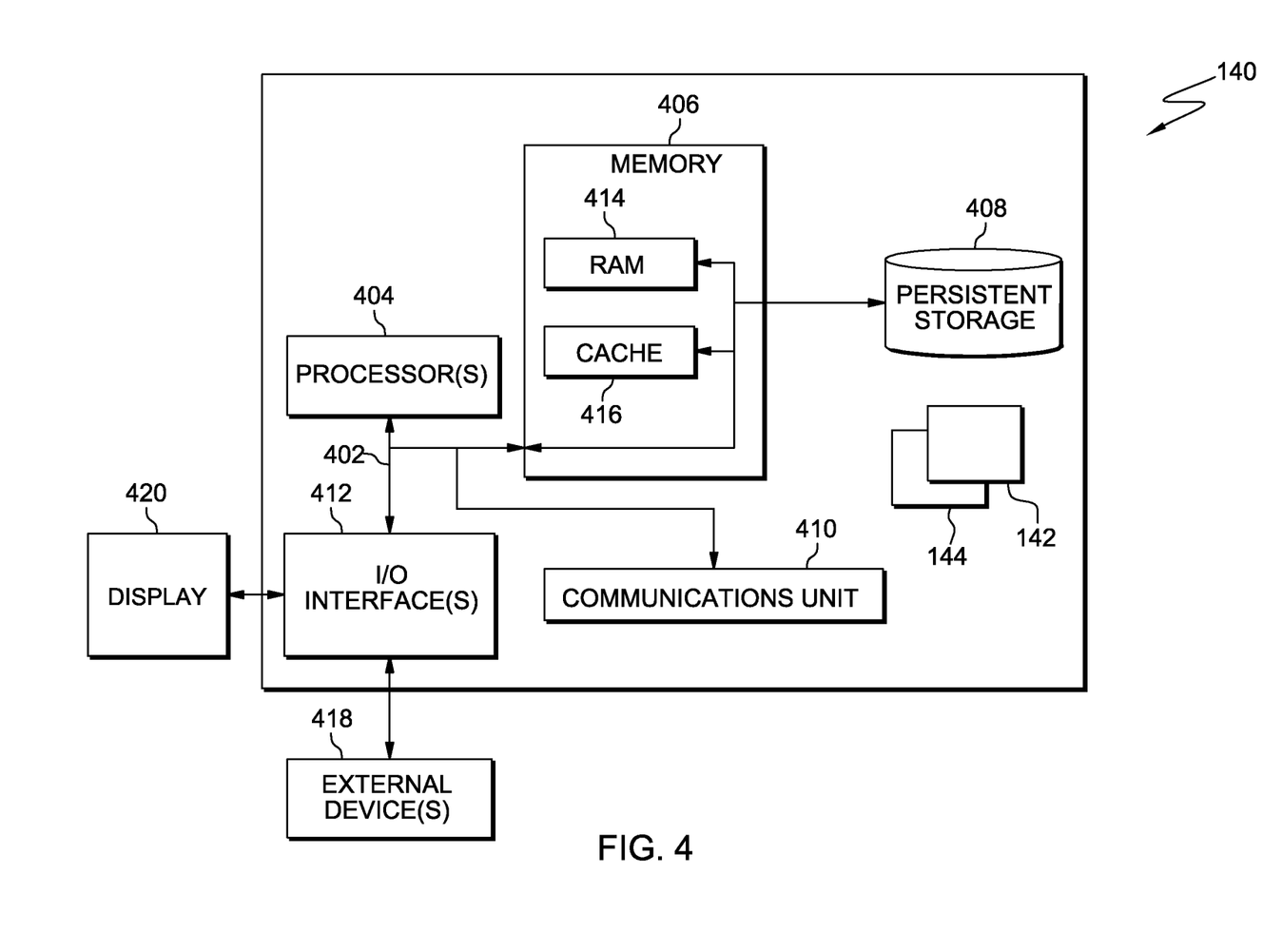
FIG. 4 depicts a block diagram of components of a data processing system, such as the server computing device of FIG. 1, in accordance with an embodiment of the present invention.

FIG. 4 depicts a block diagram of components of server computing device 140 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computing device 140 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Mapping program 142 and database 144 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including user computing device 130. In these examples, communications unit 410 includes one or more network interface cards. Communications unit 410 may provide communications through the use of either or both physical and wireless communications links. Mapping program 142 and database 144 may be downloaded to persistent storage 408 through communications unit 410.

I/O interface(s) 412 allows for input and output of data with other devices that may be connected to server computing device 140. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., mapping program 142 and database 144, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining mappings for application integration, the method comprising:
    identifying, by one or more computer processors, a plurality of integration templates that each contain a mapping of a first data field to another data field, wherein at least two of the plurality of integration templates map the first data field to different other data fields, and wherein each of the plurality of integration templates is published to a community of users within an application integration environment by at least one user in the community of users;
    receiving, by the one or more computer processors, a ranking of each of the plurality of integration templates; and
    determining, by the one or more computer processors, a preferred mapping of the first data field to a second data field, based, at least in part, on the received ranking.

2. The method of claim 1, wherein said receiving the ranking of the each of the plurality of integration templates includes receiving a ranking from the community of users.

3. The method of claim 1, further comprising:
    determining, by the one or more computer processors, a weight of each of the mappings of the first data field to each of the different other data fields, based, at least in part, on the received ranking of each of the plurality of integration templates; and determining, by the one or more computer processors, the preferred mapping of the first data field to the second data field, based, at least in part, on the determined weight.

4. The method of claim 3, wherein said determining the weight of the mapping of the first data field to each of the different other data fields further comprises:
determining, by the one or more computer processors, an overall ranking for each of the plurality of integration templates, wherein the overall ranking is an average ranking for each of the plurality of integration templates containing a mapping of the first data field to each one of the different other data fields; and
summing the overall rankings of each of the plurality of integration templates containing the mapping of the first data field to each one of the different other data fields.

5. The method of claim 1, wherein said determining a preferred mapping of the first data field to the second data field further comprises:
determining, by the one or more computer processors, a weight of each of the mappings of the first data field to each of the different other data fields, based, at least in part, on the received ranking of each of the plurality of integration templates;
comparing a determined weight of the mapping of the first data field to the second data field to each of a determined weight of the mapping of the first data field to each of the different other data fields; and
determining, by the one or more computer processors, the determined weight of the mapping of the first data field to the second data field is higher than each of the determined weight of the mapping for the first data field to each of the different other data fields.

6. The method of claim 1, wherein an integration template includes mappings for a first data field determined by the at least one user operating within the application integration environment.

7. The method of claim 1, further comprising presenting the determined preferred mapping of the first data field to the at least one user operating within the application integration environment.

8. The method of claim 1, further comprising:
determining, by the one or more computer processors, at least one additional integration template containing the mapping of the first data field to another data field is published to the community of users; and
updating, by the one or more computer processors, stored data of the plurality of integration templates with data of the at least one additional integration template.

9. A computer program product for determining mappings for application integration, the computer program product comprising:
one or more non-transitory computer-readable tangible storage devices media and program instructions stored on the one or more non-transitory computer-readable tangible storage devices media, the program instructions comprising:
program instructions to identify a plurality of integration templates containing a mapping of a first data field to another data field, wherein at least two of the plurality of integration templates map the first data field to different other data fields, and wherein each of the plurality of integration templates is published to a community of users within an application integration environment by at least one user in the community of users;
program instructions to receive a ranking of each of the plurality of integration templates; and
program instructions to determine a preferred mapping of the first data field to a second data field, based, at least in part, on the received ranking.

10. The computer program product of claim 9, wherein said program instructions to receive the ranking of the each of the plurality of integration templates include program instructions to receive a ranking from the community of users.

11. The computer program product of claim 9, further comprising:
program instructions to determine a weight of each of the mappings of the first data field to each of the different other data fields, based, at least in part, on the received ranking of each of the plurality of integration templates; and
program instructions to determine the preferred mapping of the first data field to the second data field, based, at least in part, on the determined weight.

12. The computer program product of claim 11, wherein said program instructions to determine the weight of each of the mappings of the first data field to each of the different other data fields further comprise:
program instructions to determine an overall ranking for each of the plurality of integration templates, wherein the overall ranking is an average ranking for each of the plurality of integration templates containing a mapping of the first data field to each one of the different other data fields; and
program instructions to sum the overall rankings of each of the plurality of integration templates containing the mapping of the first data field to each one of the different other data fields.

13. The computer program product of claim 9, wherein said program instructions to determine a preferred mapping of the first data field to the second data field further comprise:
program instructions to determine a weight of each of the mappings of the first data field to each of the different other data fields, based, at least in part, on the received ranking of each of the plurality of integration templates;
program instructions to compare a determined weight of the mapping of the first data field to the second data field to each of a determined weight of the mapping of the first data field to each of the different other data fields; and
program instructions to determine that the determined weight of the mapping of the first data field to the second data field is higher than each of the determined weight of the mapping for the first data field to each of the different other data fields.

14. The computer program product of claim 9, wherein an integration template includes mappings for a first data field determined by the at least one user operating within the application integration environment.

15. The computer program product of claim 9, further comprising program instructions to perform the determined preferred mapping of the first data field within the application integration environment.

16. A computer system for determining mappings for application integration, the computer system comprising:
one or more computer processors;
one or more computer-readable tangible storage media;
program instructions stored on the one or more computer-readable tangible storage media for execution by at least one of the one or more computer processors, the program instructions comprising:
program instructions to identify a plurality of integration templates containing a mapping of a first data field to another data field, wherein at least two of the plurality of integration templates map the first data field to different other data fields, and wherein each of the plurality of integration templates is published to a community of users within an application integration environment by at least one user in the community of users;

program instructions to receive a ranking of each of the plurality of integration templates; and program instructions to determine a preferred mapping of the first data field to a second data field, based, at least in part, on the received ranking.

17. The computer system of claim 16, wherein said program instructions to receive the ranking of the each of the plurality of integration templates include program instructions to receive a ranking from the community of users.

18. The computer system of claim 16, further comprising:

program instructions to determine a weight of each of the mappings of the first data field to each of the different other data fields, based, at least in part, on the received ranking of each of the plurality of integration templates; and program instructions to determine the preferred mapping of the first data field to the second data field, based, at least in part, on the determined weight.

19. The computer system of claim 18, wherein said program instructions to determine the weight of each of the mappings of the first data field to each of the different other data fields further comprise:

program instructions to determine an overall ranking for each of the plurality of integration templates, wherein the overall ranking is an average ranking for each of the plurality of integration templates containing a mapping of the first data field to each one of the different other data fields; and program instructions to sum the overall rankings of each of the plurality of integration templates containing the mapping of the first data field to each one of the different other data fields.

20. The computer system of claim 16, wherein said program instructions to determine a preferred mapping of the first data field to the second data field further comprise:

program instructions to determine a weight of each of the mappings of the first data field to each of the different other data fields, based, at least in part, on the received ranking of each of the plurality of integration templates;

program instructions to compare a determined weight of the mapping of the first data field to the second data field to each of a determined weight of the mapping of the first data field to each of the different other data fields; and program instructions to determine that the determined weight of the mapping of the first data field to the second data field is higher than each of the determined weight of the mapping for the first data field to each of the different other data fields.

* * * * *